US008657047B2

(12) United States Patent
Urabe et al.

(10) Patent No.: US 8,657,047 B2
(45) Date of Patent: Feb. 25, 2014

(54) BICYCLE HUB WITH INTEGRATED MOTOR (75) Inventors: Hiroyuki Urabe, Osaka (JP); Takahiko Hayashi, Osaka (JP); Takafumi Saiki, Tokyo (JP); Tomofusa Ishizeki, Tokyo (JP)

(73) Assignee: Shimano Inc., Osaka (JP)

( * ) Notice: Subject to any disclaimer, the term of this patent is extended or adjusted under 35 U.S.C. 154(b) by 343 days.

(21) Appl. No.: 13/157,378

(22) Filed: Jun. 10, 2011

(65) Prior Publication Data

US 2011/0303471 A1    Dec. 15, 2011

(30) Foreign Application Priority Data

Jun. 11, 2010    (JP) ................................. 2010-133829

(51) Int. Cl.
     *B60K 1/00*      (2006.01)
(52) U.S. Cl.
     USPC ......... 180/65.51; 180/220; 301/6.5; 310/67 A
(58) Field of Classification Search
     USPC ......... 180/65.51, 220, 221, 223, 224; 310/16, 310/67 A; 301/6.5, 5.309
     See application file for complete search history.

(56) References Cited

U.S. PATENT DOCUMENTS

| 4,346,777 | A | * | 8/1982 | Restelli | 180/220 |
|---|---|---|---|---|---|
| 4,677,328 | A | * | 6/1987 | Kumakura | 310/67 R |
| 4,721,177 | A | * | 1/1988 | Qizhen | 180/206.5 |
| 4,860,176 | A | * | 8/1989 | Bauwens et al. | 310/67 A |
| 4,959,578 | A | * | 9/1990 | Varga | 310/268 |
| 5,115,159 | A | * | 5/1992 | Takamiya et al. | 310/67 A |
| 5,341,892 | A | * | 8/1994 | Hirose et al. | 180/220 |
| 5,387,000 | A | * | 2/1995 | Sato | 280/216 |
| 5,450,915 | A | * | 9/1995 | Li | 180/65.51 |
| 5,581,136 | A | * | 12/1996 | Li | 310/67 R |
| 5,755,304 | A | * | 5/1998 | Trigg et al. | 180/65.51 |
| 5,782,716 | A | * | 7/1998 | Hukui et al. | 475/149 |
| 5,828,145 | A | * | 10/1998 | Nakamura | 310/67 A |
| 6,093,985 | A | * | 7/2000 | Chen | 310/67 A |
| 6,100,615 | A | * | 8/2000 | Birkestrand | 310/75 C |
| 6,118,196 | A | * | 9/2000 | Cheng-Yon | 310/75 C |
| 6,276,475 | B1 | * | 8/2001 | Nakanosono | 180/65.8 |
| 6,278,216 | B1 | * | 8/2001 | Li | 310/424 |
| 6,321,863 | B1 | * | 11/2001 | Vanjani | 180/65.51 |

(Continued)

FOREIGN PATENT DOCUMENTS

| JP | 2877606 B2 | 3/1999 |
|---|---|---|
| JP | 11-227668 A | 8/1999 |

(Continued)

OTHER PUBLICATIONS

European Search Report of corresponding EP Application No. 11 16 8332.2 dated Aug. 24, 2011.

*Primary Examiner* — Katy M Ebner
*Assistant Examiner* — Brodie Follman
(74) *Attorney, Agent, or Firm* — Global IP Counselors (57) ABSTRACT

A bicycle hub comprises a hub axle, a motor case and an integrated motor. The hub axle has a pair of frame attachment ends. The motor case is mounted on the hub axle such that the bicycle frame attachment ends protrude out of opposite axial ends of the motor case. The motor case including a recessed portion that is configured to receive a bicycle frame that is mounted to the bicycle frame attachment ends of the hub axle. The integrated motor is operatively mounted between the hub axle and the motor case.

14 Claims, 8 Drawing Sheets

(56) References Cited

U.S. PATENT DOCUMENTS

| | | | |
|---|---|---|---|
| 6,380,731 B1* | 4/2002 | Nishimoto | 324/173 |
| 6,409,197 B1* | 6/2002 | Endo et al. | 280/288.4 |
| 6,439,065 B1* | 8/2002 | Ooshima et al. | 73/862.326 |
| 6,501,199 B2* | 12/2002 | Hung | 310/67 A |
| 6,605,884 B2* | 8/2003 | Nishimoto | 310/67 A |
| 6,659,489 B2* | 12/2003 | Masui et al. | 280/304.3 |
| 6,974,144 B2* | 12/2005 | Horiuchi | 280/276 |
| 7,182,410 B2* | 2/2007 | Fukui | 301/110.5 |
| 7,199,500 B2* | 4/2007 | Yoshida | 310/257 |
| 7,249,643 B2* | 7/2007 | Etzioni et al. | 180/65.51 |
| 7,273,259 B2* | 9/2007 | Fukui | 301/110.5 |
| 7,288,865 B2* | 10/2007 | Tanaka et al. | 310/67 A |
| 7,332,882 B2* | 2/2008 | Aoyagi et al. | 318/139 |
| 7,341,316 B2* | 3/2008 | Fukui | 301/108.1 |
| 7,357,743 B2* | 4/2008 | Mao et al. | 475/5 |
| 7,375,450 B2* | 5/2008 | Tanaka et al. | 310/216.004 |
| 7,472,770 B2* | 1/2009 | Tomoshige et al. | 180/65.51 |
| 7,479,079 B2* | 1/2009 | Takeda et al. | 475/3 |
| 7,540,361 B2* | 6/2009 | Matsueda | 188/218 R |
| 7,575,106 B2* | 8/2009 | Matsueda | 188/218 R |
| D625,333 S* | 10/2010 | Tanaka et al. | D15/3 |
| 8,100,208 B2* | 1/2012 | Jordan | 180/65.51 |
| 8,131,413 B2* | 3/2012 | Yuan | 701/22 |
| 8,242,369 B2* | 8/2012 | Kiely et al. | 174/84 R |
| 8,245,804 B2* | 8/2012 | van Rooij | 180/65.51 |
| 8,278,789 B2* | 10/2012 | Nakano | 310/67 A |
| 8,413,748 B2* | 4/2013 | Nishikawa et al. | 180/65.51 |
| 2002/0135330 A1* | 9/2002 | Birkestrand et al. | 318/139 |
| 2003/0213630 A1* | 11/2003 | Pyntikov et al. | 180/220 |
| 2004/0189112 A1* | 9/2004 | Fujii et al. | 310/67 A |
| 2004/0262065 A1* | 12/2004 | Horiuchi | 180/205 |
| 2005/0037633 A1* | 2/2005 | Endo | 439/36 |
| 2005/0264111 A1* | 12/2005 | Tanaka et al. | 310/75 C |
| 2005/0264112 A1* | 12/2005 | Tanaka et al. | 310/75 C |
| 2006/0006732 A1* | 1/2006 | Fukui | 301/110.5 |
| 2006/0052205 A1* | 3/2006 | Bausola et al. | 475/164 |
| 2006/0065452 A1* | 3/2006 | Tomoshige et al. | 180/65.1 |
| 2006/0163961 A1* | 7/2006 | Iteya et al. | 310/75 C |
| 2006/0208558 A1* | 9/2006 | Fukui | 301/5.309 |
| 2006/0208561 A1* | 9/2006 | Fukui | 301/110.5 |
| 2006/0283644 A1* | 12/2006 | Matsueda | 180/205 |
| 2007/0245846 A1* | 10/2007 | Armstrong et al. | 74/502.2 |
| 2007/0252452 A1* | 11/2007 | Ishimoto et al. | 310/67 A |
| 2010/0071954 A1* | 3/2010 | Kiely et al. | 174/88 R |
| 2010/0212980 A1* | 8/2010 | Wang | 180/65.51 |
| 2010/0243350 A1* | 9/2010 | Nishikawa et al. | 180/65.51 |
| 2010/0301711 A1* | 12/2010 | Ando et al. | 310/67 A |
| 2011/0198144 A1* | 8/2011 | Hsu et al. | 180/206.6 |
| 2011/0303471 A1* | 12/2011 | Urabe et al. | 180/65.51 |
| 2011/0304200 A1* | 12/2011 | Saida et al. | 307/9.1 |
| 2012/0025677 A1* | 2/2012 | Adachi | 310/67 R |
| 2012/0132473 A1* | 5/2012 | Weber et al. | 180/58 |
| 2012/0161495 A1* | 6/2012 | Ito | 301/6.5 |
| 2012/0161496 A1* | 6/2012 | Urabe | 301/6.5 |
| 2012/0184379 A1* | 7/2012 | Christini et al. | 464/46 |
| 2012/0305325 A1* | 12/2012 | Ito | 180/206.6 |
| 2012/0316709 A1* | 12/2012 | Saida | 701/22 |
| 2012/0316710 A1* | 12/2012 | Saida | 701/22 |
| 2013/0009451 A1* | 1/2013 | Nishikawa et al. | 301/6.5 |
| 2013/0015009 A1* | 1/2013 | Lin et al. | 180/220 |
| 2013/0049549 A1* | 2/2013 | Folmli et al. | 310/67 A |
| 2013/0145885 A1* | 6/2013 | Kitamura et al. | 74/473.12 |

FOREIGN PATENT DOCUMENTS

| | | |
|---|---|---|
| JP | 2000-211574 A | 8/2000 |
| JP | 2001-71983 A | 3/2001 |
| JP | 2002-240771 A | 8/2002 |
| JP | 2003-2277 A | 1/2003 |
| JP | 2003-095179 A | 4/2003 |
| JP | 2004-142631 A | 5/2004 |
| JP | 2005-22476 A | 1/2005 |

* cited by examiner

BICYCLE HUB WITH INTEGRATED MOTOR

CROSS-REFERENCE TO RELATED APPLICATIONS

This application claims priority under 35 U.S.C. §119 to Japanese Patent Application No. 2010-133829, filed Jun. 11, 2010. The entire disclosure of Japanese Patent Application No. 2010-133829 is hereby incorporated herein by reference.

BACKGROUND

1. Field of the Invention

This invention generally relates to a bicycle hub. More specifically, the present invention relates to a bicycle hub and, particularly, to a bicycle hub with an integrated motor that constitutes a hub of a wheel of a bicycle.

2. Background Information

Among bicycles, assist bicycles are conventionally known in which human-powered drive force is assisted by a motor. There are assist bicycles that adopt a motor-integrated hub in which a motor is provided in a wheel. A conventional motor-integrated hub is known in which a motor control circuit that drives a motor such as an inverter is arranged inside the motor-integrated hub (for example, refer to Japanese Laid-Open Patent Application No. 2003-095179).

A conventional motor-integrated hub has a hub axle, a first case member fixed to a first end side of the hub axle, a second case member rotatably mounted to a second end side of the hub axle and to the first case member, a rotor having a coil, and a magnet fixed to the first case member. The first case member is also arranged inside the second case member with the rotor positioned therebetween. The motor control circuit is housed in the first case member inside the second case member arranged with the rotor positioned therebetween.

SUMMARY

With the conventional configuration described above, since the motor control circuit is arranged inside the hub, a length of a frame mount portion of the motor-integrated hub in a hub axle direction increases. When the length of the frame mount portion of the motor-integrated hub in the hub axle direction increases, the motor-integrated hub cannot be mounted to an existing frame and a dedicated frame for mounting the motor-integrated hub becomes necessary.

One object of the present disclosure is to minimize a length of a frame mount portion of a bicycle hub with an integrated motor in the hub axle direction.

In accordance with a first aspect of the present disclosure, a bicycle hub is proposed that basically comprises a hub axle, a motor case and an integrated motor. The hub axle has a pair of frame attachment ends. The motor case is mounted on the hub axle such that the bicycle frame attachment ends protrude out of opposite axial ends of the motor case. The motor case including a recessed portion that is configured to receive a bicycle frame that is mounted to the bicycle frame attachment ends of the hub axle. The integrated motor is operatively mounted between the hub axle and the motor case. Therefore, a space can be formed inside the motor case around the recessed portion, and a part of an electrical component or a motor or the like can be housed using the space. As a result, the length of a frame mount portion of the motor-integrated hub in the hub axle direction can be minimized.

In accordance with a second aspect of the present disclosure, the bicycle hub of the first aspect is further configured such that the recessed portion is configured to receive a distal end portion of a front fork that is a part of a front frame of the bicycle. In this case, since the recessed portion can be formed smaller than in a case where a chain stay of a rear wheel is received by the recessed portion, a large space can be formed inside the motor case around the recessed portion.

In accordance with a third aspect of the present disclosure, the bicycle hub of the first or second aspect is further provided with a motor control circuit disposed inside a first space that is defined by a bulging portion of the motor case which bulges outward in a hub axle direction. In this case, even if the motor control circuit is provided in the motor-integrated hub, the length of the frame mount portion in the hub axle direction can be minimized.

In accordance with a fourth aspect of the present disclosure, the bicycle hub according to any of the first to third aspects is further configured such that the motor case includes a first case member non-rotatably coupled to the hub axle and a second case member rotatably supported by the hub axle, and the first case member defining a second space within the first case member, and the first case member including the recessed portion. In this case, since the recessed portion is provided on the first case member that is non-rotatably coupled to the hub axle, the recessed portion and the frame no longer relatively rotate when the hub axle is fixed to the frame.

In accordance with a fifth aspect of the present disclosure, the bicycle hub according to the fourth aspect is further configured such that the first case member includes a case main body and a cover that define the first space therebetween. The case main body is non-rotatably coupled to the hub axle and supports the second case member. The cover member includes the recessed portion. In this case, since the first case member is constituted by the case main body and the cover member having a recessed portion, the first space can be readily formed and the recessed portion can be formed more easily.

In accordance with a sixth aspect of the present disclosure, the bicycle hub of the fifth aspect is further provided with a tube member having a first end arranged at a part of the second space and a second end arranged at a wiring connecting portion of the cover member. The wiring connecting portion protrudes outward from the case main body such that the wiring connecting portion is arranged along a front fork while the bicycle hub is in an installed position on the bicycle frame. In this case, since one end of the tube member is arranged at a part of the second space and the other end of the tube member is arranged at the wiring connecting portion that can be arranged along the front fork, an atmospheric pressure inside the second space becomes equal to an atmospheric pressure inside the wiring connecting portion that is similar to outside air. As a result, failures due to a variation in atmospheric pressure such as dew condensation inside the second space can be suppressed.

In accordance with a seventh aspect of the present disclosure, the bicycle hub according to any of the third to sixth aspects is further configured such that the motor control circuit has an inverter circuit for driving the integrated motor. In this case, since the inverter circuit for driving the motor is arranged inside the first space, wiring of the motor and the inverter circuit can be performed more readily.

In accordance with an eighth aspect of the present disclosure, the bicycle hub according to the seventh aspect is further configured such that the inverter circuit has a semiconductor drive element. In this case, the motor is driven by the semiconductor drive element in the inverter circuit.

In accordance with a ninth aspect of the present disclosure, the bicycle hub of the eighth aspect is further provided with a radiating member arranged between an inside surface of the bulging portion and the semiconductor drive element. The radiating member is in contact with the bulging portion and the semiconductor drive element. In this case, heat generated at the semiconductor drive element that is a field-effect transistor or the like can be efficiently transferred via the radiating member to the bulging portion that is in contact with outside air. As a result, overheating of the semiconductor drive element can be suppressed.

In accordance with a tenth aspect of the present disclosure, the bicycle hub according to any of the third to ninth aspects is further configured such that the motor control circuit includes an electric power line communication circuit, and the motor case includes a duplex connecter that is electrically connected to the electric power line communication circuit. In this case, since communication and supply of power between the motor-integrated hub and an exterior electrical component can be performed with the duplex electric power line, the number of wiring between the electrical components can be reduced.

According to the present disclosure, for example, the distal end portion of the front fork to which a wheel is mounted among the frame can be arranged at the recessed portion provided on the motor case. Therefore, a space can be formed inside the motor case around the recessed portion and a part of an electrical component or a motor or the like can be housed using the space. As a result, the length of the frame mount portion of the motor-integrated hub in the hub axle direction can be minimized.

Various objects, features, aspects and advantages of the motor-integrated hub will become apparent to those skilled in the art from the following detailed description, which, taken in conjunction with the annexed drawings, discloses one illustrative embodiment of a motor-integrated hub.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
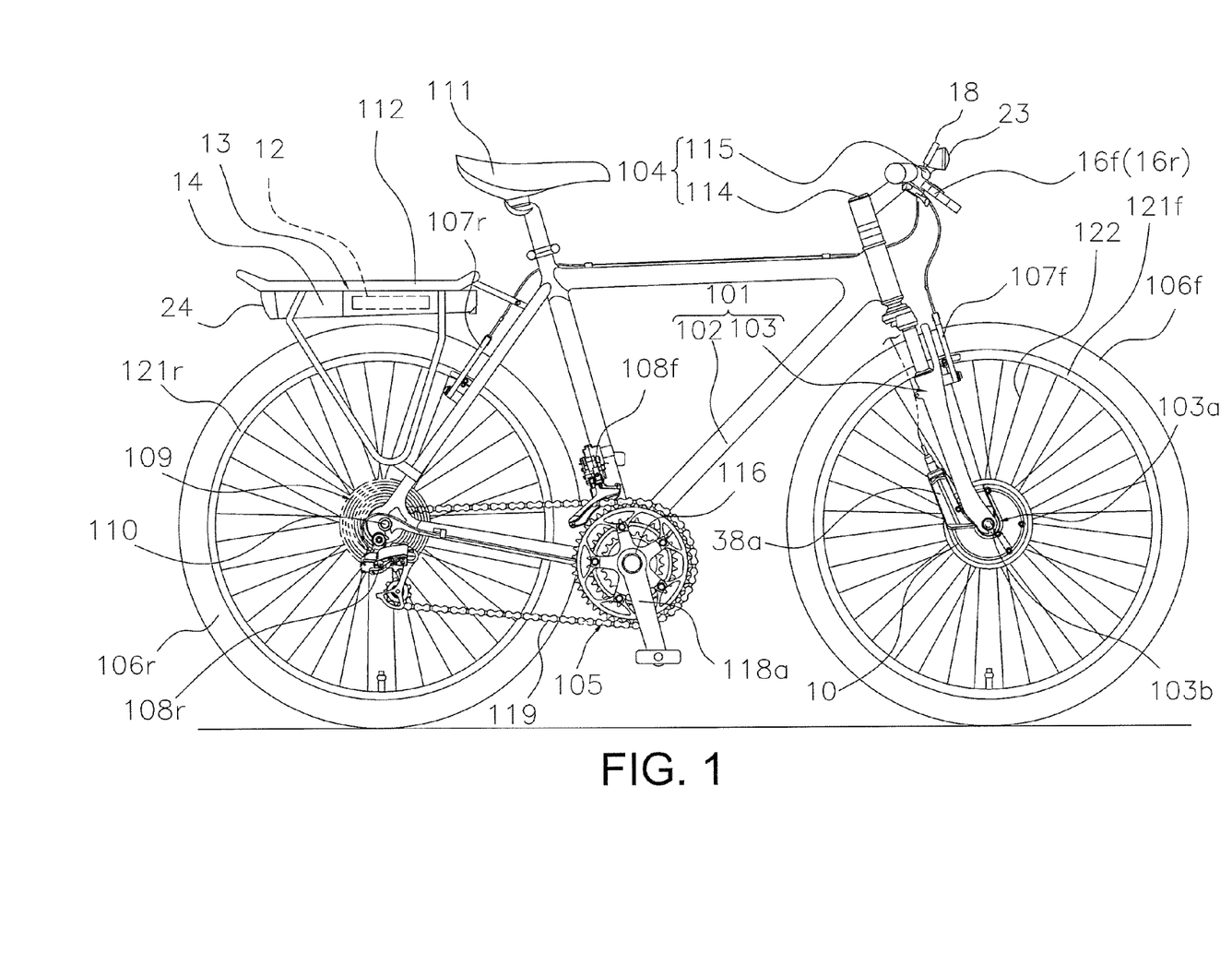
FIG. 1 is a right side elevational view of a bicycle that is equipped with a motor-integrated hub in accordance with one embodiment.

Referring initially to FIG. 1, a bicycle is illustrated which is equipped with a power-assisted bicycle in which human-powered driving is assisted by a motor-integrated hub or motor unit 10 in accordance with one illustrated embodiment. In the following description, the terms "left" and "right" of the bicycle are defined so that when the bicycle is viewed from the rear, the rightward direction is defined as the right, and the leftward direction is defined as the left.

The bicycle includes a frame 101 having a frame body 102 and a front fork 103 with a handle part 104. The bicycle further includes a drive part 105, a front wheel 106f, a rear wheel 106r, a front braking device 107f, a rear braking device 107r, a headlamp 23 and a tail light 24. The front fork 103 is mounted to a front part of the frame body 102 so as to pivot around an inclined axis. The front brake device 107f performs braking by coming into contact with and applying a braking force to a front rim 121f of the front wheel 106f. The rear brake device 107r performs braking by coming into contact with and applying a braking force to a rear rim 121r of the rear wheel 106r.

A variety of parts including a saddle 111 and the handle part 104 are attached to the frame 101. The drive part 105 includes a front derailleur 108f, a rear derailleur 108r and a gear set 109 mounted on a rear hub 110 of the rear wheel 106r. The drive part 105 also includes a crank shaft 116 supported by a hanger part of the frame body 102 in a rotatable manner. The drive part 105 further includes a gear crank 118a and a left crank (not shown) that are secured to both ends of the crank shaft 116. The drive part 105 has a chain 119 provided around the gear crank 118a and the gear set 109.

In the front derailleur 108f, the chain 119 is engaged around one of, e.g., three sprockets mounted on the gear crank 118a. In the rear derailleur 108r, the chain 119 is engaged around one of, e.g., nine sprockets of the gear set 109 attached to the rear hub 110. The front derailleur 108f and the rear derailleur 108r are both electrically driven.

The rear derailleur 108r has an electric shift motor or actuator (not shown), a stage sensor detecting a current shift stage, and a derailleur control portion that controls the electric actuator and the stage sensor. The front derailleur 108f also has an electric shift motor or actuator (not shown), a stage sensor detecting a current shift stage, and a derailleur control portion that controls the electric actuator and the stage sensor. A shift switch that instructs gear shifting is provided on the handlebar 115. The derailleur control portion controls the electric actuator in response to an operation of the shift switch. While the front derailleur 108f and the rear derailleur 108r are to be electrically driven in the present embodiment, the front derailleur 108f and the rear derailleur 108r can alternatively be configured so as to be coupled to shift levers via wires and shift-driven when the wires are pulled by the shift levers.

A rear carrier 112 is mounted to a rear upper part of the frame body 102. A rear carrier unit 13 including an overall control portion 12 that controls electrical components of the entire bicycle is mounted to the rear carrier 112. A power storage portion 14 that acts as a power supply for the electrical components such as the motor-integrated hub 10, the overall control portion 12, and the headlamp 23 is detachably mounted on the rear carrier unit 13. The power storage portion 14 is configured so as to include a storage battery that is a nickel-hydride battery, a lithium-ion battery, or the like. The tail light 24 is integrally mounted to the power storage portion 14.

The handle part 104 has a handle stem 114 fixed to an upper part of the front fork 103 and a bar handle-type handlebar 115 fixed to the handle stem 114. A left brake lever 16f and a right brake lever 16r are mounted on both ends of the handlebar 115. In addition, a display unit 18 and the headlamp 23 are mounted to a central part of the handlebar 115. The display unit 18 is capable of displaying operating modes such as an assist mode and a regenerative brake mode.

Figure 2:
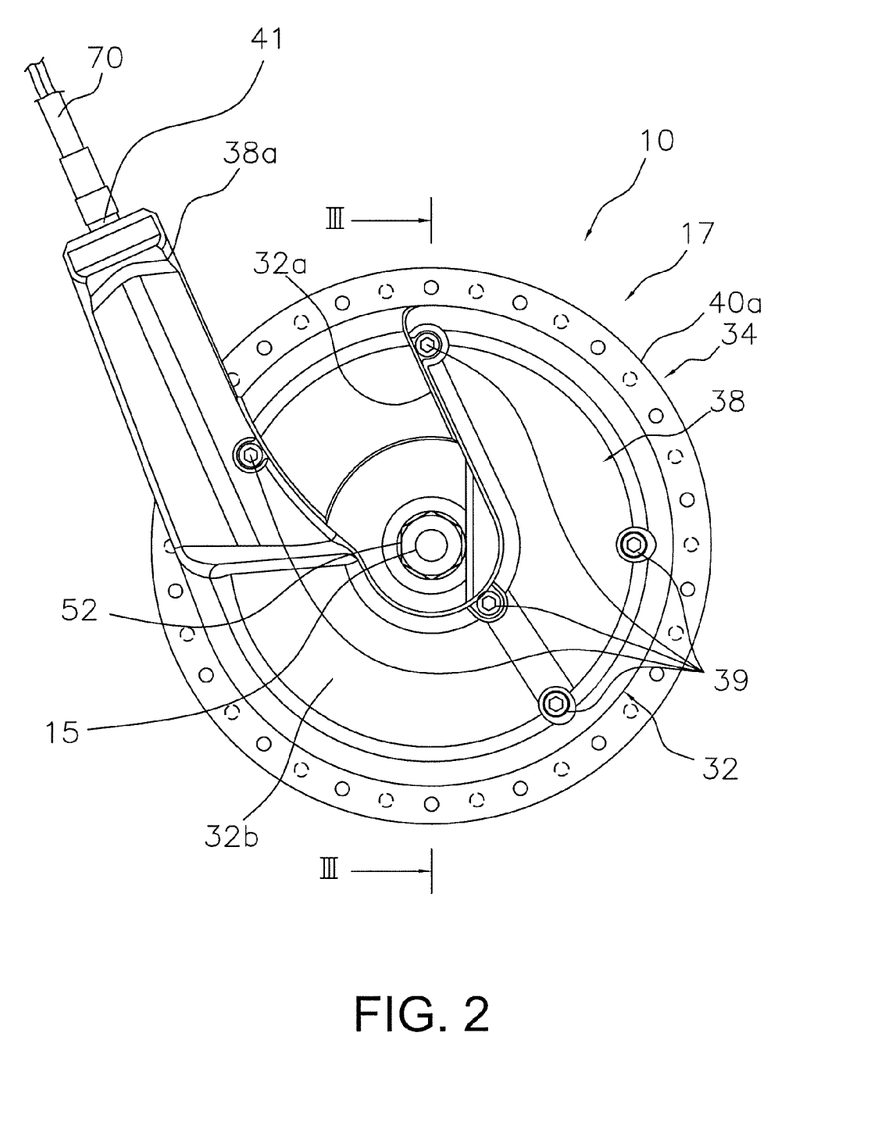
FIG. 2 is a right side elevational view of the motor-integrated hub illustrated in FIG. 1.
Figure 3:
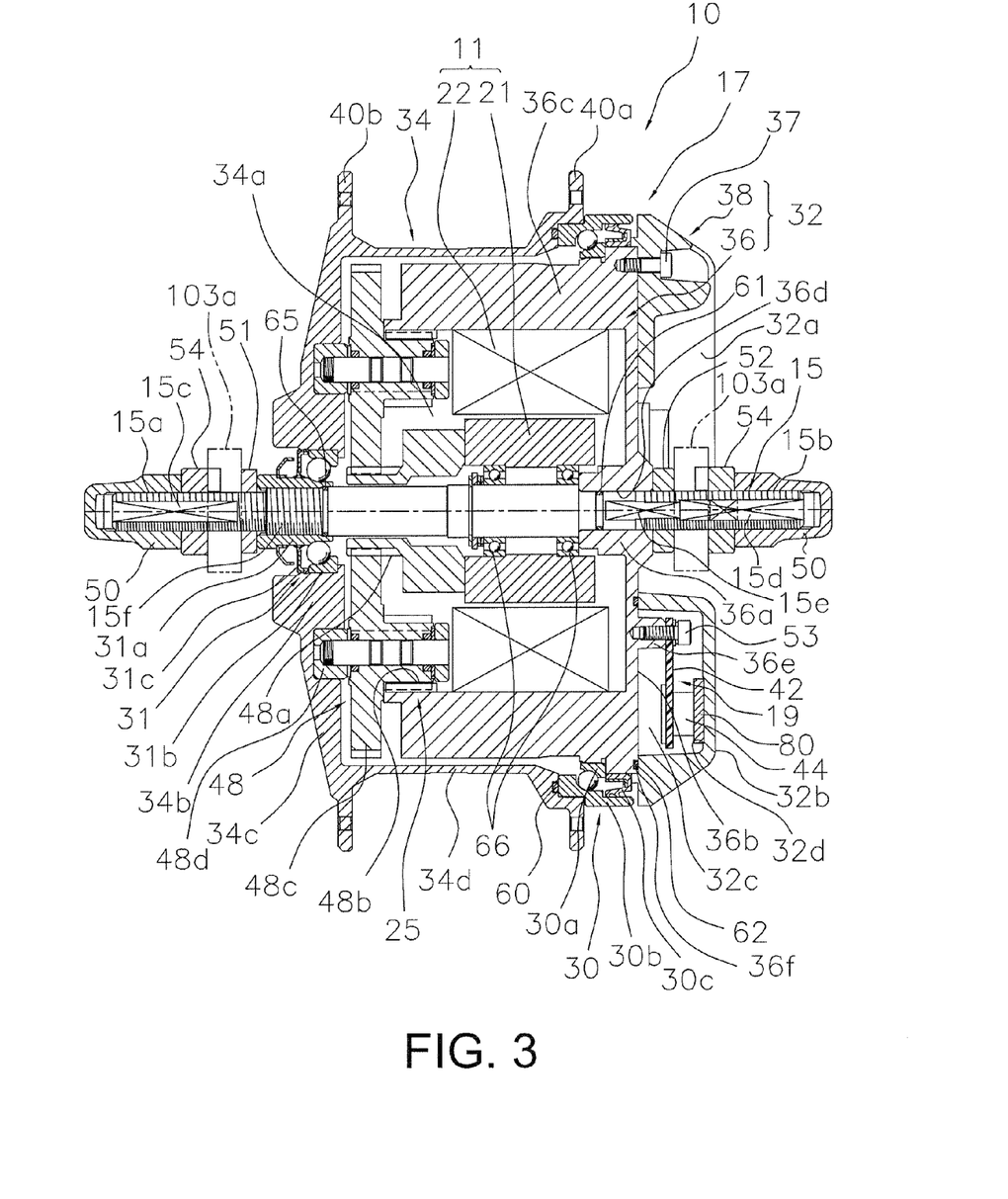
FIG. 3 is a cross-sectional view of the motor-integrated hub taken along a cross-sectional line III-III in FIG. 2.

The motor-integrated hub 10 constitutes a hub of the front wheel 106f of the bicycle. The motor-integrated hub 10 is mounted to a distal end of the front fork 103 and is for assisting human-powered driving. The motor-integrated hub 10 includes, for example, a three-phase brushless DC motor. As shown in FIG. 2, the motor-integrated hub 10 has a hub axle 15 and a motor case 17 mounted to the hub axle 15. In addition, as shown in FIG. 3, the motor-integrated hub 10 has a motor 11, a motor control circuit 19, and a rotation transmitting mechanism 25 housed inside the motor case 17.

The hub axle 15 is made of, for example, steel. Both ends of the hub axle 15 are non-rotatably mountable to a front pawl portion 103a on the distal end of the front fork 103. A first male screw portion 15a and a second male screw portion 15b which constitute a left and right pair and to which nut members 50 for fixing the hub axle 15 to the front fork 103 are to be screwed are formed on outer circumferential surfaces of both ends of the hub axle 15. In addition, a first fixing portion 15c and a second fixing portion 15d respectively having two parallel surfaces are formed on outer circumferential surfaces of the first male screw portion 15a and the second male screw portion 15b. A rotation locking portion 15e for non-rotatably coupling the first case member 32, to be described later, of the motor case 17 is formed at an inward position of the second fixing portion 15d in the hub axle direction. A nut member 50 and a locknut 51 are screwed to the first male screw portion 15a. A nut member 50 and a nut member 52 that fixes the first case member 32 to the hub axle 15 are screwed to the second male screw portion 15b. A turning preventing washer 54 which respectively non-rotatably engages the first fixing portion 15c and the second fixing portion 15d and which engages a mounting groove 103b of the front fork 103 to prevent turning of the hub axle 15 is mounted to an inward position of the nut member 50 in an axial direction.

In addition, a third male screw portion 15f onto which screws a second axle bearing 31 that rotatably supports a second end of the second case member 34, to be described later, of the motor case 17 is formed at an inward position of the first male screw portion 15a in a hub axial direction. A central portion of the hub axle 15 has a larger diameter than the first male screw portion 15a and the second male screw portion 15b.

As shown in FIGS. 2 to 6, the motor case 17 has the first case member 32 non-rotatably coupled to the hub axle 15, and the second case member 34 having a first end (a right end in FIG. 3) rotatably supported by the first case member 32 and a second end (a left end in FIG. 3) rotatably supported by the hub axle 15. The second case member 34 is made of, for example, an aluminum alloy. The first case member 32 has a recessed portion 32a which is formed on an outside surface and which is capable of receiving the distal end portion of the front fork 103, and a bulging portion 32b which forms the recessed portion 32a and which bulges outward in the hub axle direction. A first space 32c is formed inside the bulging portion 32b. A second space 34a is internally formed by the second case member 34 and the first case member 32.

The first case member 32 has a case main body 36 non-rotatably mounted to the hub axle 15 and a cover member 38 fixed to an outside surface of the case main body 36 by a plurality of (for example, five) mounting bolts 37. The first space 32c is formed between the cover member 38 and the case main body 36. The case main body 36 and the cover member 38 are made of, for example, an aluminum alloy.

The case main body 36 has a first boss portion 36a non-rotatably coupled to the hub axle 15, a first circular plate portion 36b integrally formed with the first boss portion 36a, and a tubular first cylindrical portion 36c that extends from an outer circumferential portion of the first circular plate portion 36b toward the second case member 34. A noncircular coupling hole 36d to be non-rotatably coupled to the rotation locking portion 15e of the hub axle 15 is formed on an inner circumferential surface of the first boss portion 36a. An outside surface of the first circular plate portion 36b is an approximately flat surface. A plurality of mounting bosses 36e formed so as to protrude outward in the direction of the hub axle 15 is formed on the outside surface. The motor control circuit 19 is fixed to the mounting bosses 36e by mounting bolts 53. An inner ring 30a of for example, a ball bearing-type first axle bearing 30 that rotatably supports the first end of the second case member 34 is mounted to the outer circumferential surface of the first cylindrical portion 36c. A sealing member 30c that provides sealing between the first cylindrical portion 36c and the outer ring 30b is arranged outside the first axle bearing 30. In addition, a sealing O-ring 60 is arranged between the outer ring 30b and the second case member 34. Furthermore, a sealing O-ring 61 is arranged between an inner circumferential portion of the first boss portion 36a and the hub axle 15. Consequently, foreign objects are less likely to penetrate into the second space 34a inside the second case member 34 from the outside of the first case member 32.

Figure 6:
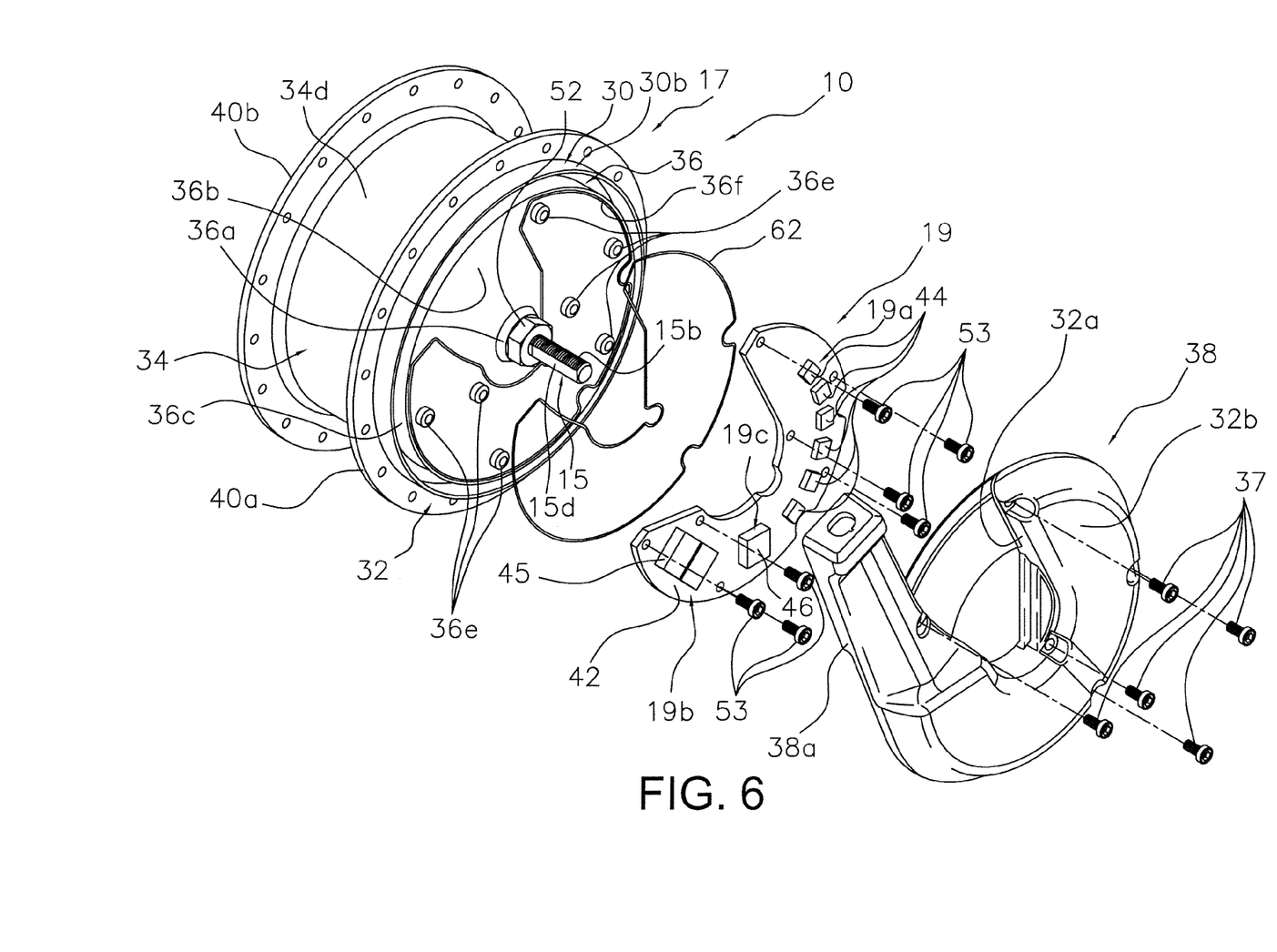
FIG. 6 is an exploded perspective view of the motor-integrated hub illustrated in FIGS. 1 to 5.

The cover member 38 has, on an outside surface thereof, the aforementioned recessed portion 32a and the bulging portion 32b. On an inside surface of the cover member 38, a sealing member 62 that suppresses penetration of liquids into the first space 32c that is an arrangement space of the motor control circuit 19 is arranged between the cover member 38 and the case main body 36. The sealing member 62 is arranged on the inside surface of the cover member 38 on the outside of the recessed portion 32a and at an outer circumferential part of the bulging portion 32b. The sealing member 62 is formed by rubber or the like which is waterproof and elastic. As shown in FIGS. 3 and 6, the sealing member 62 is mounted to a sealing groove 36f formed on the outside surface of the first circular plate portion 36b of the case main body 36.

Figure 4:
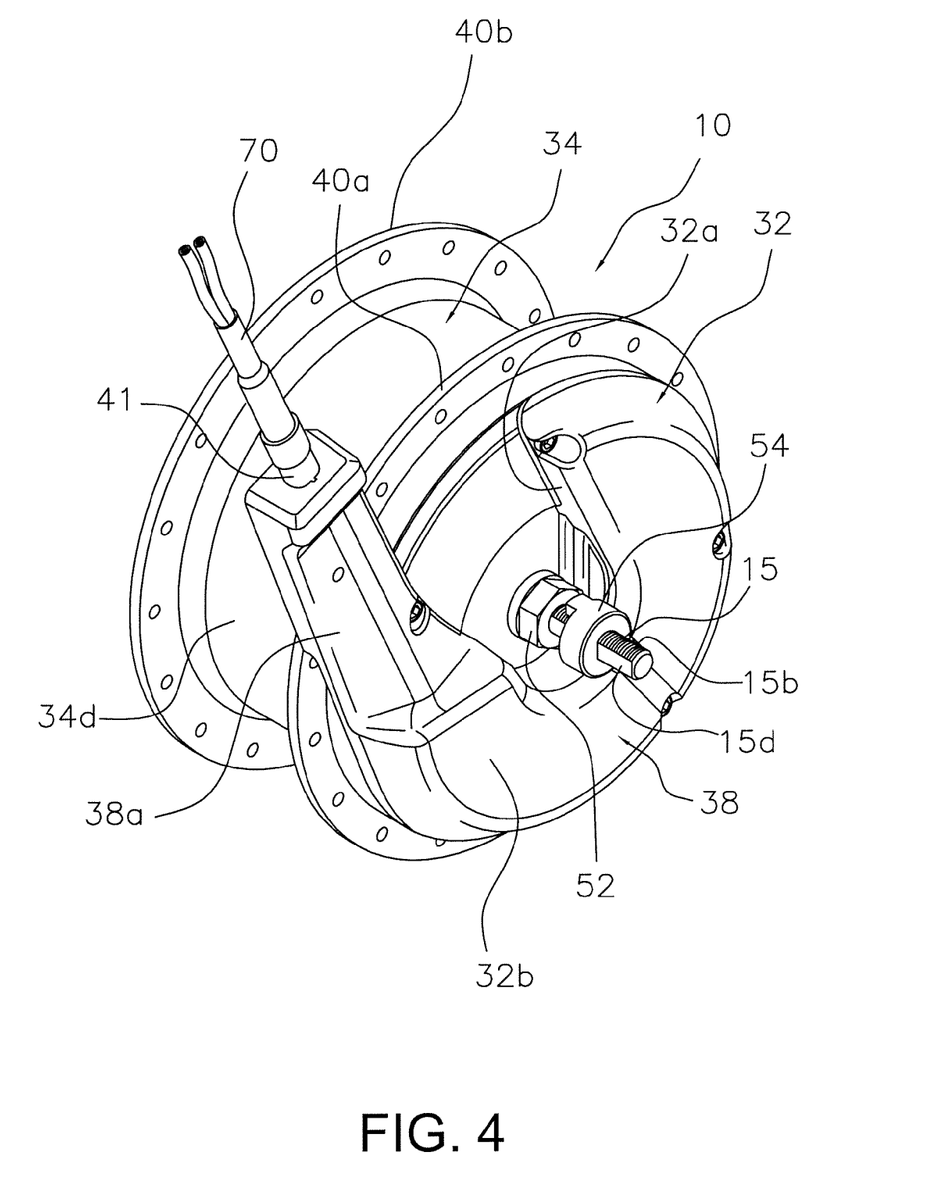
FIG. 4 is a left perspective view of the motor-integrated hub illustrated in FIGS. 1 to 3.

As shown in FIGS. 2 and 4, the recessed portion 32a is formed depressed in an approximate U-shape. In the present embodiment, the recessed portion 32a is formed depressed in an approximate U-shape that fans out slightly from a central portion through which the hub axle 15 penetrates. The recessed portion 32a is formed slightly wider than a distal end shape of an ordinary front fork so as to enable front forks of various shapes to be inserted.

The first space 32c formed by the case main body 36 and the cover member 38 inside the bulging portion 32b has an approximate horseshoe shape. The motor control circuit 19 fixed to the first circular plate portion 36b is arranged inside the first space 32c. A sheet mounting groove 32d of the motor control circuit 19 is formed on an inside surface of the bulging portion 32b. The sheet mounting groove 32d is provided at a position facing a plurality of semiconductor elements (in particular, the field-effect transistor 44 to be described later) and is a groove for positioning and mounting a radiator sheet 80 that is a radiating member. The sheet mounting groove 32d is formed in the same shape as the radiator sheet 80.

A wiring connecting portion 38a is formed on one edge of the recessed portion 32a so as to protrude outward in a circumferential direction of the case main body 36. The wiring connecting portion 38a is formed slightly depressed in the hub axle direction than the bulging portion 32b. The wiring connecting portion 38a is provided in order to extract, to the outside, a duplex electric power line 70 (FIG. 7) that connects the motor control circuit 19 with the overall control portion 12 and the power storage portion 14. The wiring connecting portion 38a has a connector 41 capable of connecting the electric power line 70. Moreover, in the present embodiment, the electric power line 70 is configured so as to be capable of power supply and signal communication due to PLC (power line communications). The connector 41 (FIG. 7) is provided on a distal end of the wiring connecting portion 38a. For example, the connector 41 is a duplex female connector.

Figure 5:
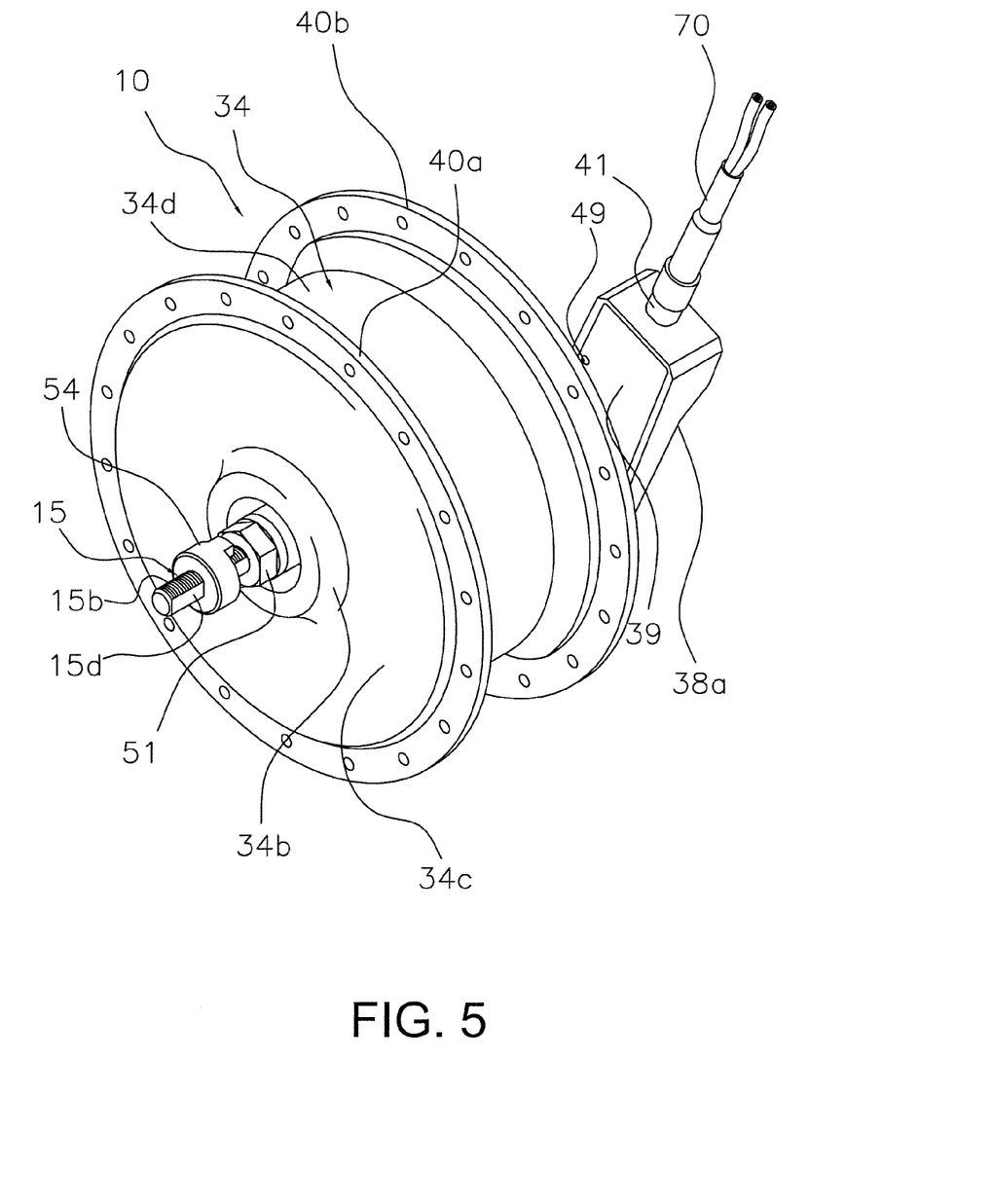
FIG. 5 is a right perspective view of the motor-integrated hub illustrated in FIGS. 1 to 4.
Figure 7:
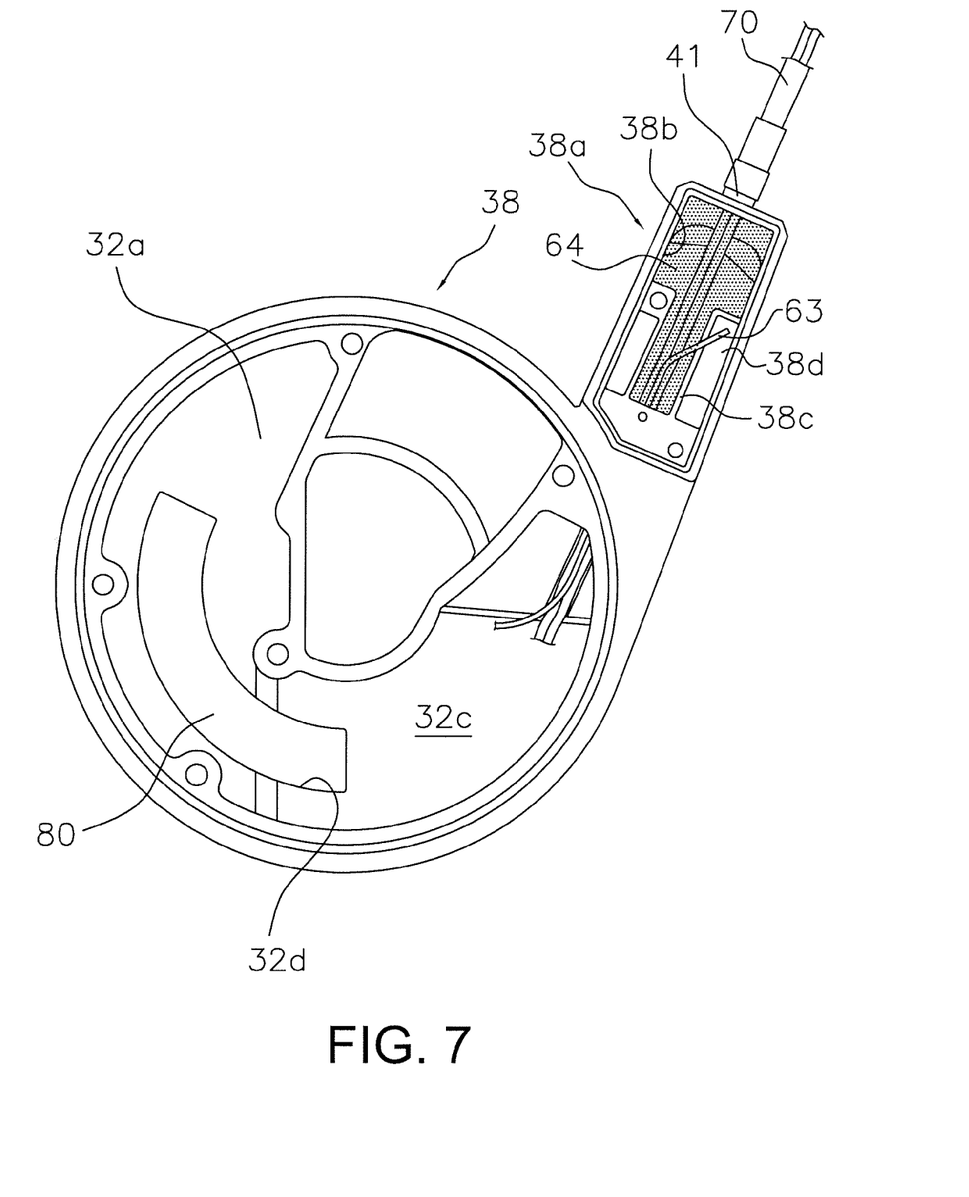
FIG. 7 is an inside elevational view of a substrate cover for the motor-integrated hub illustrated in FIGS. 1 to 6.

As shown in FIG. 1, the wiring connecting portion 38a is formed in proximity to a rear portion of the front fork 103 and arranged along the front fork 103. A third space 38b that communicates with the first space 32c is formed at the wiring connecting portion 38a. As shown in FIG. 7, an adjustment space 38d separated by a partition 38c is formed inside the third space 38b. A distal end portion (other end portion) of an atmospheric pressure adjustment tube 63 that is a tube member is arranged in the adjustment space 38d. The atmospheric pressure adjustment tube 63 is provided for adjusting an atmospheric pressure inside the second space 34a. A base end portion (one end portion) of the atmospheric pressure adjustment tube 63 is arranged in the second space 34a through the first space 32c. A sealant 64 is filled into the third space 38b through which the electric power line 70 of the wiring connecting portion 38a passes. The sealant 64 is made of a waterproof and insulating resin and includes, for example, silicon resin. As shown in FIG. 5, an inside surface of the wiring connecting portion 38a is covered by a cap member 39 that is fixed to the wiring connecting portion 38a by a screw 49. A sealing member is not arranged between the cap member 39 and the wiring connecting portion 38a, and the sealant 64 is not filled into the adjustment space 38d. As a result, outside air can be introduced into the adjustment space 38d to maintain the same atmospheric pressure inside the adjustment space 38d as the outside air. Therefore, due to the atmospheric pressure adjustment tube 63, the second space 34a is also maintained to the same atmospheric pressure as outside air. Consequently, failures due to a variation in atmospheric pressure such as dew condensation inside the second space 34a are less likely to occur.

The second case member 34 has a structure similar to a hub shell of an ordinary bicycle hub and is a bottomed tubular member. The second case member 34 has a second boss portion 34b supported by a second axle bearing 31, a second circular plate portion 34c integrally formed with the second boss portion 34b, and a second cylindrical portion 34d tubularly extending inward in the hub axle direction from an outer circumferential portion of the second circular plate portion 34c.

The second axle bearing 31 is mounted on an inner circumferential surface of the second boss portion 34b between the hub axle 15 and the second boss portion 34b. An inner ring 31a of the second axle bearing 31 is capable of screwing onto a third male screw portion 15f formed on the hub axle 15 and adjusting an axle direction position. The adjusted inner ring 31a is prevented from turning by the locknut 51. An outer ring 31b is mounted on the inner circumferential surface of the second boss portion 34b. A sealing member 31c that provides sealing between the second boss portion 34b and the inner ring 31a is arranged outside the second axle bearing 31. In addition, an O-ring 65 is arranged between an inner circumferential surface of the inner ring 31a and an outer circumferential surface of the hub axle 15. Consequently, foreign objects are less likely to penetrate into the second space 34a from the second end side of the second case member 34.

The second cylindrical portion 34d is arranged on an outer circumferential side of the first cylindrical portion 36c. An outer ring 30b of the first axle bearing 30 is mounted to a first end-side inner circumferential surface of the second cylindrical portion 34d. A first hub flange 40a and a second hub flange 40b for coupling the rim 121f of the front wheel 106f and the motor-integrated hub 10 with each other by spokes 122 are formed at an interval at both ends in the hub axle direction on an outer circumferential surface of the second cylindrical portion 34d.

Since the first circular plate portion 36b is provided between the first space 32c and the second space 34a, the motor control circuit 19 that is housed in the first space 32c is less likely to become contaminated by grease or the like.

Figure 8:
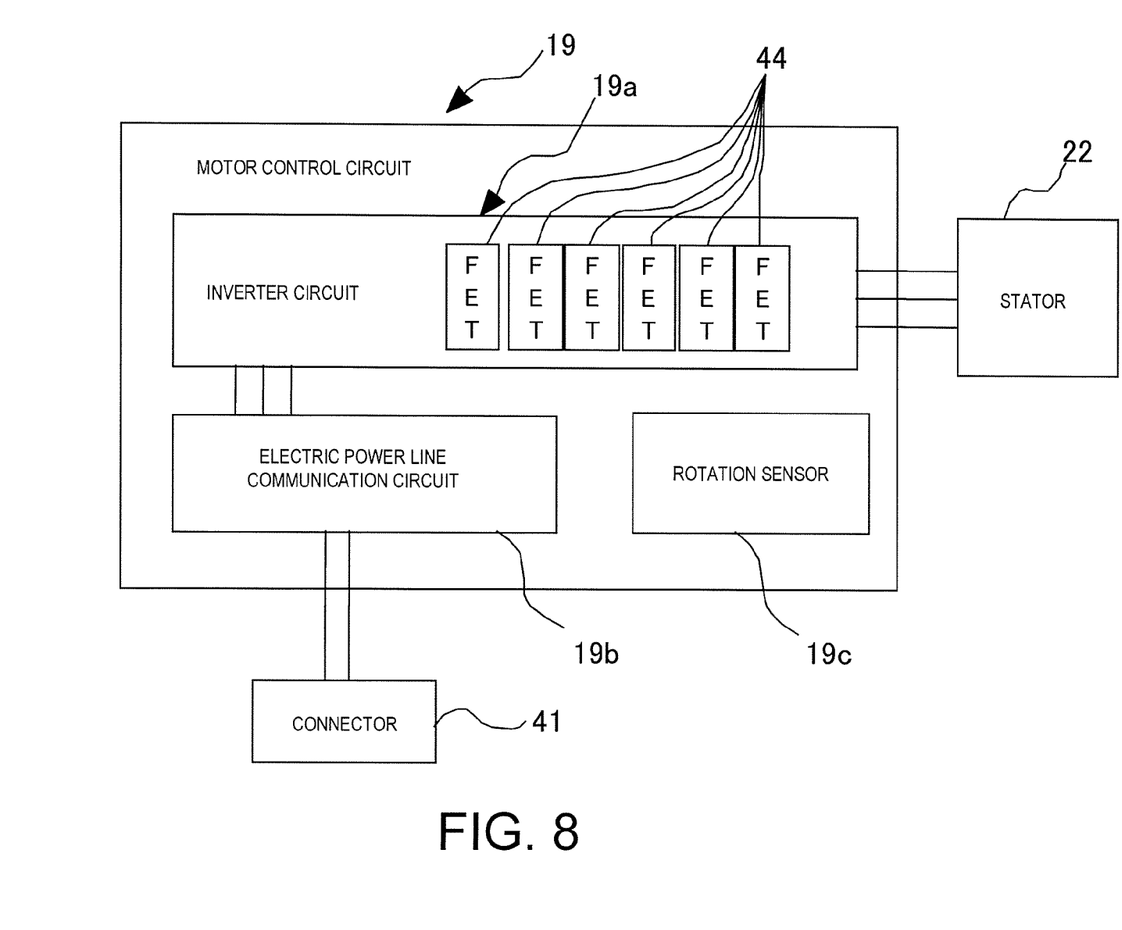
FIG. 8 is a block diagram showing a configuration of a motor control circuit for the motor-integrated hub illustrated in FIGS. 1 to 6.

As shown in FIG. 8, the motor control circuit 19 has an inverter circuit 19a that switches a direct current supplied from the power storage portion 14 and converts the direct current into an alternating current, an electric power line communication circuit 19b, and a rotation sensor 19c. The inverter circuit 19a varies a duty ratio to vary a driving force of the motor-integrated hub 10 and also to vary a regenerative braking force when the motor-integrated hub 10 is used as a power generator. The inverter circuit 19a is connected to a stator 22. The electric power line communication circuit 19b is a circuit for communicating with other electrical components via the electric power line 70. The electric power line communication circuit 19b is electrically connected to the connector 41. The rotation sensor 19c detects at least any of a rotation and a rotational speed of the motor-integrated hub 10 from a frequency of the switching.

As shown in FIGS. 6 and 8, the inverter circuit 19a has a plurality of (for example, six) field-effect transistors (FETs) 44 mounted to a circuit board 42 fixed to the outside surface of the case main body 36. The plurality of field-effect transistors 44 is arranged in contact with the radiator sheet 80. Accordingly, heat generated at the field-effect transistors 44 can be partially conducted by the cover member 38 via the radiator sheet 80 and discharged to the outside from the cover member 38.

As shown in FIG. 6, the electric power line communication circuit 19b is mounted on the circuit board 42. The electric power line communication circuit 19b has a signal processing element 45 having a signal processing function for decoding and modulating a control signal superimposed on power, or the like. The rotation sensor 19c has an arithmetic element 46 mounted on the circuit board 42. The circuit board 42 is fixed to mounting bosses 36e formed protruding on the outside surface of the case main body 36 by a plurality of (for example, seven) mounting bolts 53. The circuit board 42 is formed in an approximate U-shape or an approximate C-shape.

The motor 11 has a rotor 21 and a stator 22 arranged on an outer circumferential side of the rotor 21 so as to oppose the rotor 21.

The rotor 21 is arranged inside the second space 34a and rotatably supported by the hub axle 15. The rotor 21 has a magnet (not shown) having, for example, a plurality of magnetic poles in a circumferential direction, and a magnet holding portion that holds the magnet. The magnet holding portion is rotatably supported by the hub axle 15 via two axle bearings 66 arranged at an interval in a hub axle direction.

The stator 22 is arranged inside the second space 34a on an outer circumferential side of the rotor 21. The stator 22 is fixed to the inner circumferential surface of the first cylindrical portion 36c of the case main body 36 and has a plurality of (for example, six) coils (not shown) arranged at intervals in a circumferential direction. The plurality of coils is sequentially excited by an alternating current that is switched by the field-effect transistors 44 of the inverter circuit 19*a* of the motor control circuit 19, and rotates the rotor 21 in a direction of forward movement of the bicycle.

The rotation transmitting mechanism 25 transmits rotation of the rotor 21 to the second case member 34 and transmits rotation of the front wheel 106*f* to the rotor 21. The rotation transmitting mechanism 25 has a planetary gear mechanism 48. The planetary gear mechanism 48 has a sun gear 48*a*, an internal gear 48*b* arranged on an outer circumferential side of the sun gear 48*a*, and a plurality of (for example, three) planet gears 48*c* that mesh with the sun gear 48*a* and the internal gear 48*b*. The sun gear 48*a* is fixed to the rotor 21. The internal gear 48*b* is provided on the case main body 36. The plurality of planet gears 48*c* is rotatably supported by a carrier 48*d*. Each planet gear 48*c* has two gear portions, namely, first and second gear portions, having different numbers of teeth. The first gear portion meshes with the sun gear 48*a* and the second gear portion meshes with the internal gear 48*b*. The carrier 48*d* is fixed to an inside surface of the second circular plate portion 34*c* of the second case member 34. With this planetary gear mechanism 48, since the internal gear 48*b* provided on the case main body 36 is non-rotatably fixed to the hub axle 15, rotation of the sun gear 48*a* to which the rotor 21 is coupled is decelerated and transmitted to the second case member 34.

When incorporating the motor-integrated hub 10 into the front fork 103, the hub axle 15 is mounted to the mounting groove 103*b* of the front pawl portion 103*a* at the distal end of the front fork 103. At this point, since the distal end portion of the front fork 103 can be arranged in the recessed portion 32*a* of the cover member 38 of the first case member 32 of the motor-integrated hub 10, a length between mount portions of the motor case 17 to the front fork 103 does not increase. In addition, since the bulging portion 32*b* is provided outward in a radial direction of the recessed portion 32*a* and the motor control circuit 19 is provided inside the bulging portion 32*b*, a length of the motor-integrated hub 10 between mount portions to the front fork 103 does not increase even if the motor control circuit 19 is internally provided. Therefore, the motor-integrated hub 10 mountable to a front fork 103 with an existing hub mount width can be easily designed.

When mounting the hub axle 15 to the mounting groove 103*b*, the nut members 50 are mounted from both ends of the hub axle 15 and the turning preventing washer 54 is engaged with the mounting groove 103*b* to prevent turning of the hub axle 15. The motor-integrated hub 10 is fixed to the front fork 103 by tightening the nut members 50 in this state.

While a preferred embodiment of the motor-integrated hub has been described above, it is to be understood that the present invention is not limited thereto and that various modifications may be made without departing from the spirit and scope of the invention.

(a) While a brushless DC motor has been exemplified in the embodiment described above, the present invention can also be applied to a brush motor in which a coil rotates. In this case, a motor control circuit that drives a motor by a regenerative driving function and frequency modulation may be provided at the bulging portion.

(b) While a coupling structure for a hub brake device is not provided in the motor-integrated hub 10 in the embodiment described above, a coupling structure may alternatively be provided. For example, a coupling structure capable of coupling a roller brake drum or a disk brake rotor so that the roller brake drum or the disk brake rotor can rotate together may be provided on an outer circumferential surface of the second boss portion 34*b*.

(c) While the motor-integrated hub 10 mountable to the front wheel 106*f* has been exemplified in the embodiment described above, the present invention is not limited thereto. For example, the present invention can also be applied to a motor-integrated hub mountable to the rear wheel 106*r*. In this case, the recessed portion need only be shaped so as to be capable of receiving a coupling portion of a chain stay and a seat stay.

(d) In the embodiment described above, the first case member 32 is constituted by the case main body 36 and the cover member 38. However, the present invention is not limited thereto and the first case member may alternatively be formed integrally. In this case, a recessed portion and a bulging portion are to be formed on an outside surface of the integrated first case member. For example, a separate partition may be provided inside the first case member to form a first space and a second space, or a configuration may be adopted in which the partition is not provided.

(e) A mechanical configuration of the motor 11 is not limited to the configuration described above. For example, while the embodiment described above uses an inner rotor-type motor, an outer rotor-type motor may be used instead.

(f) While a planetary gear mechanism is included as a rotation transmitting mechanism in the embodiment described above, a configuration may alternatively be adopted in which a planetary gear mechanism is not used and the rotor 21 is directly connected to the second case member 34. In addition, the planetary gear mechanism need only be configured so as to decelerate rotation of the rotor 21 and is not limited to the configuration described above.

(g) While the assist bicycle is configured so as to have an external shifting device in the embodiment described above, the assist bicycle may alternatively be configured so as to have an internal shifting device or not to include any shifting device. Accordingly, the present system is applicable to any assist bicycle.

(h) While the single radiator sheet 80 is in contact with the plurality of field-effect transistors 44 in the embodiment described above, a configuration may alternatively be adopted in which a plurality of radiator sheets 80 is separately brought into contact with the plurality of field-effect transistors 44. Alternatively, the radiator sheet 80 may be provided so as to come into contact with electronic parts mounted on the circuit board 42 other than the field-effect transistors 44.

Thus, the foregoing descriptions of the embodiments according of bicycle regenerative brake control device are provided for illustration only, and not for the purpose of limiting the invention as defined by the appended claims and their equivalents.

What is claimed is:

1. A bicycle hub comprising:
    a hub axle having a pair of frame attachment ends;
    a motor case mounted on the hub axle such that the frame attachment ends protrude out of opposite axial ends of the motor case, the motor case including a recessed portion that is configured to receive a bicycle frame that is mounted to the frame attachment ends of the hub axle,
    the motor case including a first case member non-rotatably coupled to the hub axle and a second case member rotatably supported by the hub axle, the first case member defining a second space within the first case member, and the first case member including the recessed portion; and
    an integrated motor operatively mounted between the hub axle and the motor case.

2. The bicycle hub according to claim 1, wherein
the recessed portion is configured to receive a distal end portion of a front fork that is a part of a front frame of the bicycle.

3. The bicycle hub according to claim 1, further comprising a motor control circuit disposed inside a first space that is defined by a bulging portion of the motor case which bulges outward in a hub axle direction.

4. The bicycle hub according to claim 1, wherein
the first case member includes a case main body and a cover that define the first space therebetween, the case main body being non-rotatably coupled to the hub axle and supporting the second case member, and the cover member including the recessed portion.

5. The bicycle hub according to claim 4, further including a tube member having a first end arranged at a part of the second space and a second end arranged at a wiring connecting portion of the cover member, the wiring connecting portion protruding outward from the case main body such that the wiring connecting portion is arranged along a front fork while the bicycle hub is in an installed position on the bicycle frame.

6. The bicycle hub according to claim 3, wherein
the motor control circuit has an inverter circuit for driving the integrated motor.

7. The bicycle hub according to claim 6, wherein
the inverter circuit has a semiconductor drive element.

8. The bicycle hub according to claim 3, wherein
the motor control circuit includes an electric power line communication circuit, and
the motor case includes a duplex connecter that is electrically connected to the electric power line communication circuit.

9. The bicycle hub according to claim 2, further comprising a motor control circuit disposed inside a first space that is defined by a bulging portion of the motor case which bulges outward in a hub axle direction.

10. The bicycle hub according to claim 1, wherein
the motor control circuit has an inverter circuit for driving the integrated motor.

11. The bicycle hub according to claim 10, wherein
the inverter circuit has a semiconductor drive element.

12. The bicycle hub according to claim 11, further comprising
a radiating member arranged between an inside surface of the bulging portion and the semiconductor drive element, and the radiating member being in contact with the bulging portion and the semiconductor drive element.

13. The bicycle hub according to claim 1, wherein
the motor control circuit includes an electric power line communication circuit, and
the motor case includes a duplex connecter that is electrically connected to the electric power line communication circuit.

14. A bicycle hub, comprising:
a hub axle having a pair of frame attachment ends;
a motor case mounted on the hub axle such that the frame attachment ends protrude out of opposite axial ends of the motor case, the motor case including a recessed portion that is configured to receive a bicycle frame that is mounted to the frame attachment ends of the hub axle;
an integrated motor operatively mounted between the hub axle and the motor case;
a motor control circuit disposed inside a first space that is defined by a bulging portion of the motor case which bulges outward in a hub axle direction, the motor control circuit having an inverter circuit for driving the integrated motor, the inverter circuit having a semiconductor drive element; and
a radiating member arranged between an inside surface of the bulging portion and the semiconductor drive element, and the radiating member being in contact with the bulging portion and the semiconductor drive element.

* * * * *